United States Patent
Ben-Zvi

(10) Patent No.: US 7,392,359 B2
(45) Date of Patent: Jun. 24, 2008

(54) NON-BLOCKING DISTINCT GROUPING OF DATABASE ENTRIES WITH OVERFLOW

(75) Inventor: Boaz Ben-Zvi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

(21) Appl. No.: 10/677,398

(22) Filed: Oct. 1, 2003

(65) Prior Publication Data

US 2005/0076029 A1    Apr. 7, 2005

(51) Int. Cl.
*G06F 12/06*    (2006.01)
(52) U.S. Cl. .......................... 711/170; 707/1; 711/108
(58) Field of Classification Search ................. 711/170, 711/152, 108, 217, 218; 707/1, 200, 100, 707/202
See application file for complete search history.

(56) References Cited

U.S. PATENT DOCUMENTS

| | | | | | |
|---|---|---|---|---|---|
| 5,511,190 | A | * | 4/1996 | Sharma et al. | 707/1 |
| 6,070,170 | A | * | 5/2000 | Friske et al. | 707/202 |
| 6,115,715 | A | * | 9/2000 | Traversat et al. | 707/100 |
| 2003/0131215 | A1 | * | 7/2003 | Bellew | 712/200 |
| 2005/0071320 | A1 | * | 3/2005 | Chkodrov et al. | 707/3 |

* cited by examiner

*Primary Examiner*—Pierre-Michel Bataille

(57) ABSTRACT

A grouping mechanism is provided which can return distinct groups of entries of data that satisfy a users query in a non-blocking fashion. Each distinct group can normaly be returned to the user substantially concurrently with the following entries being received and processed. The grouping mechanism supports an overflow mechanism which can transfer parts of the data between a primary memory to a secondary memory to alleviate shortage of primary memory. This non-blocking mechanism is useful as a part of a dataflow model data processing system.

12 Claims, 7 Drawing Sheets

NON-BLOCKING DISTINCT GROUPING OF DATABASE ENTRIES WITH OVERFLOW

BACKGROUND

There are a variety of mechanisms for grouping rows of data using databases. Searching data to group data using databases demands a considerable amount of computer processing. Such prior-art hash grouping devices as a "hash groupby" node (such as exists in certain versions of Structured Query Language [SQL]) represents one prior-art mechanism that reads input rows, and thereupon groups the rows of data into groups of rows of data based on a user's query.

Prior-art hash grouping nodes typically group aggregate rows of data into groups based on the query. An example of a query that is seeking an aggregate grouping would be "what are the average employee's salaries in each division of a particular company". To properly process such a query, the data relating to every employee in the company would have to be input, the employees could then be grouped into groups representing their divisions, and the average employee salary for each division would have to be calculated. Such an aggregate query would have little meaning if the query was performed prior to inputting all of the data relating to all of the employees into the hash groupby node. With the prior-art hash grouping devices that provide aggregate grouping, no useful data is provided to (or accessible by) the user until all of the input rows of data is analyzed and returned. Analyzing and returning the input rows of data for a large database could take a considerable amount of time, even if a user is interested only in a relatively small or focused amount of the data.

It would therefore be desirable to provide a mechanism by which rows of data that do not need to be grouped as aggregates (e.g., distinct rows of data as described in this disclosure) can be processed using a hash grouping device that can return rows of data to the user substantially concurrently with the rows being received at the group-by node.

BRIEF DESCRIPTION OF THE DRAWINGS

The same numbers are used throughout the drawings to reference similar features and components.

DETAILED DESCRIPTION

The type of query being performed on data within databases determines how the data can be most effectively returned to the user. Consider aggregate queries that are seeking query results based a compilation of all of the pertinent data in a database. An example of an aggregate query is "what are the average employee's salaries in each division of a particular company". To perform such an aggregate query using a hash groupby node, the data from all of the employees in the company have to be input to the hash groupby node, and then the data has to be analyzed. Based on an analysis of the data, such a hash groupby node can group the rows of data into groups, each group for example representing a division of the company, and containing the average salary in that division.

Prior art versions of the hash groupby node act as a blocking node, by which none of the data input from the input rows of data are returned to the user until all of the data from the input rows of data are read and processed. Such blocking nodes inherently decrease the concurrent processing aspect as desired for pipelining. The operation of a prior-art blocking version of the hash groupby node is described in U.S. Pat. No. 5,511,190 entitled "Hash-Based Database Grouping System and Method", issued on Apr. 23, 1996 to Sharma et al. (incorporated herein by reference). This prior-art version of the blocking hash groupby node is concentrated primarily on grouping aggregates of rows. With this prior-art version of the hash groupby node that is directed to aggregation, no single output row can be returned (to the user) before the last one of the input rows is read and processed. Unfortunately, such prior-art hash groupby nodes that rely on aggregate grouping typically demand a considerable amount of time to return any rows of data to the user.

Figure 1:
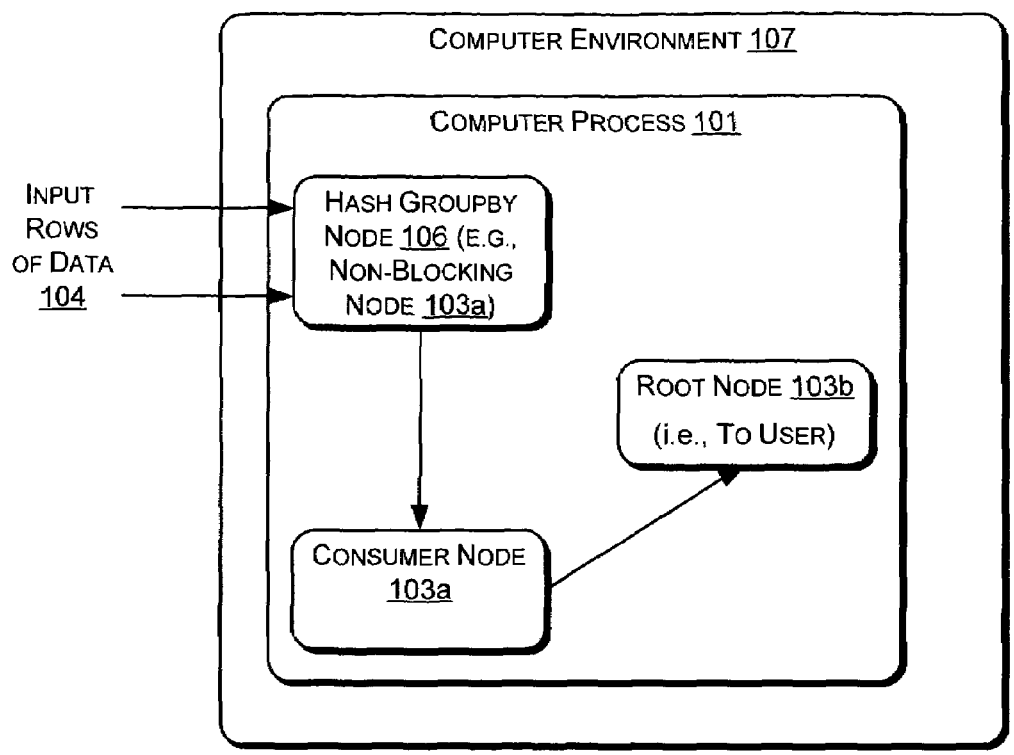
FIG. 1 is a block diagram of one embodiment of a computer environment that can run a computer process that includes one embodiment of a hash groupby node and a number of other non-blocking nodes.
Figure 2:
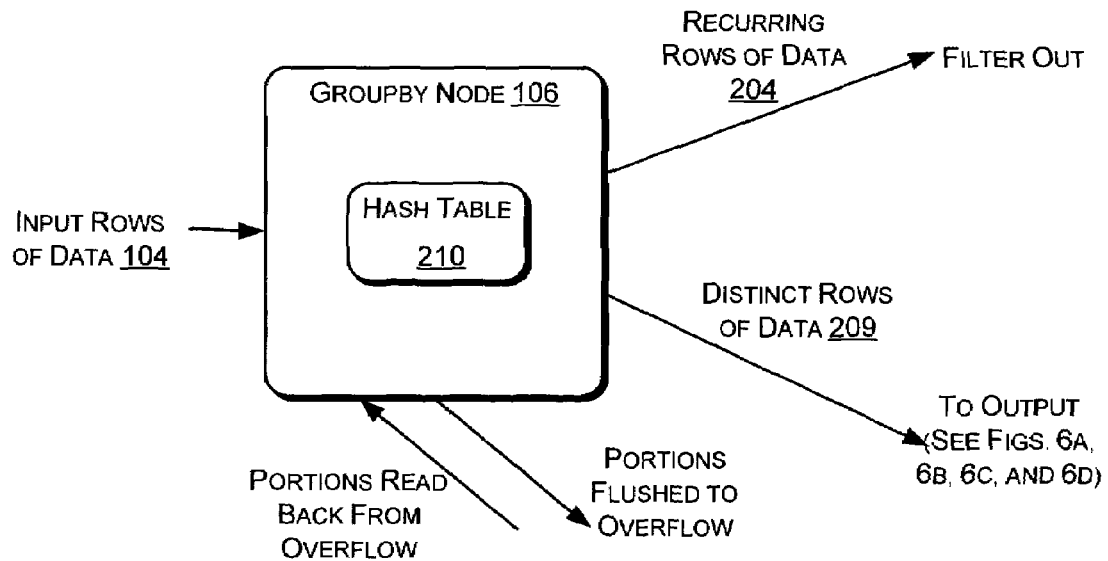
FIG. 2 is a block diagram of one embodiment of the hash groupby node as shown in FIG. 1.
Figure 3:
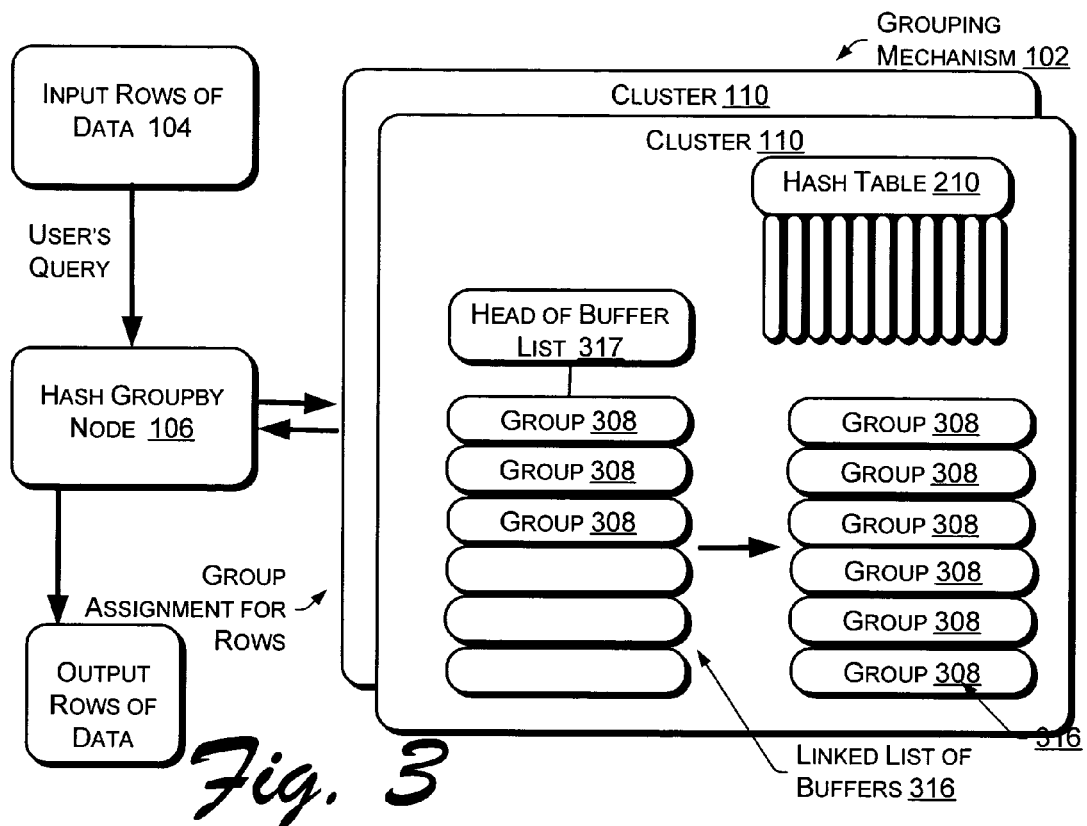
FIG. 3 is a block diagram of one embodiment of grouping mechanism that can group a number of rows of data.

One embodiment of the hash groupby node as described with respect to FIGS. 1, 2, and 3 current disclosure groups rows of data and returns them as distinct rows of data (instead of aggregate rows of data). The concept of grouping rows distinctly uses a different type of query. An illustrative example of a query searching for distinct groups may seek all of the individual authors who have written books in a library. This query simply returns the name of each author who has written a book in the library, whether that author has written one book or has written many books. As such, queries for distinct rows of data are searching for the first received (by the hash groupby node) instance of each occurrence. The first returned instance can be concurrently returned to the user as the hash groupby node continues processing other rows of data. Subsequent rows of data that match previously returned rows of data can be thereupon not returned to the user since the user already has the first occurrence of, e.g., a book written by that author.

This concurrent return of distinct rows of data to the user can be performed much more quickly than in prior-art return of aggregate rows of data. As such, providing one embodiment of hash groupby node that is optimized to search for distinct rows of data can provide a considerable savings in query time.

Within databases as described in this disclosure, consider that the data is often stored in the form of "rows". In alternate embodiments, data may also be stored in columns, multiple rows or columns, fractions of rows or columns, or some other arbitrary selection mechanism is within the meaning of the term "entry" and also within the intended scope of the present disclosure. The term "entry" as used within this disclosure is used to apply to all of these techniques to store data in databases. One significant feature of databases is the ability to group data. Rows are grouped into groups; and each group is itself one or more rows, containing the grouping (i.e., common) data from its rows, and possibly aggregate data (e.g., the number of rows grouped).

The processing nodes that handle data from databases may be categorized as blocked nodes or non-blocked nodes. With blocked nodes, data is not output from the node to the user until all of the data is read and analyzed. Nodes suited for aggregating rows of data are inherently blocked. With non-blocked nodes, individual rows of data that match a query can be output to the user prior to the node receiving all of its data (and the groups of data can be processed prior to reading all of the data in the database). Searching distinct rows of data can be done by a non-blocking node.

While this grouping can theoretically be performed manually while remaining within the intended scope of the present disclosure, it is to be understood that the application of computer to provide queries for databases has made the use of databases much more reliable, efficient, and inexpensive. In general, FIG. 1 shows one aspect of a grouping mechanism that includes a computer environment 107 that can provide a number of computer operations known as a computer process 101. Another more detailed embodiment of a computer environment 107 that can support a grouping mechanism is described below in this disclosure with respect to FIG. 5.

Computer processes 101 in FIG. 1 can be configured to perform a number of tasks using a variety of application programs and operating systems as is generally known in the computer and database technologies. Such application programs and/or operating systems are often configured as nodes, in which each node is assigned its own specific task(s). It is preferred to interrelate the operation of a number of nodes within each application program and/or operating system whereby these many of the tasks to be performed by many of the nodes can be performed concurrently.

This concurrent operation of multiple nodes within a computer process 101 is generally known as pipelining. In general, non-blocking enhances pipelining of the data from one node to another node compared to blocking. Pipelining techniques are hindered when one (or more) node is delayed which, in effect, breaks the pipeline and greatly reduces the concurrent processing that is a desired goal of concurrent processing.

As described with respect to FIG. 1, the computer process 101 includes a number of the computer process nodes 103. The nodes are connected in tree shaped graph, where some nodes (sometimes called "leaf nodes") read input rows from external sources, process those rows and send the results to be consumed and processed by other tree nodes and so on. The processed data rows are eventually funneled into a special node (known as "root node") which returns them to an external user. There are a number of tree nodes 103a shown with respect to FIG. 1 including the hash groupby node 106 and another "consumer" non-blocking node 103a. The hash groupby node 106 feeds its output rows of data into the input of the "consumer" non-blocking node 103a. Each computer process node 103a, 103b can be programmed using software techniques, hardware techniques, firmware techniques, or a combination of these techniques to provide its particular contribution to the overall computer process 101.

Each node may include either a blocking node or a non-blocking node. A blocking node 103a (e.g., one that is aggregating rows of data) may detract from concurrency of processing within the computer process 101 since the blocking node 103a does not output its rows of data to the other nodes 103a, or root node 103b until all of its input data is read. FIG. 1 shows one embodiment in which all of the nodes 103a that input data to the root node 103b are of the non-blocking variety. Non-blocking nodes 103a generally enhance concurrency of processing or pipelining within the computer process 101 since the non-blocking node 103a can output its rows of data to the other nodes 103a, root nodes 103b, or users soon after the rows of data are received. Using non-blocking nodes 103a improves concurrency of the computer process 101 compared to using blocking nodes 103a.

The hash groupby node 106 as shown in FIG. 1 acts generally to group data applied as input rows of data 104 into groups using a hash table as described herein. The hash groupby node is arranged in series with an additional "consumer" non-blocking node 103a. The output of the "consumer" non-blocking node is input into the root node 103b. In this manner unlike occurs downstream of blocking nodes, such nodes as, for example, the "consumer" node in FIG. 1, need not wait for other nodes to supply them with data rows (for example, the hash groupby node in FIG. 1) to finish before they can start processing. Efficiency is improved in computer processing using many embodiments of computer process nodes 103 (including nodes 103a and root nodes 103b as shown in FIG. 1) based on the "pipelining" techniques by which all of the nodes 103a (including the hash groupby node 106 and the "consumer" non-blocking node 103a as shown in FIG. 1) perform their respective tasks substantially concurrently.

Pipelining as described with the hash groupby node 106, the "consumer node" 103a, and the root node 103b may be considered as one example of data flow in which the nodes 106, 103a, and 103b are arranged in a tree form. It is also possible that another node may output streams of rows of data into the "consumer" node 103a as shown in FIG. 1.

This embodiment of grouping mechanism 102 is configured to improve data flow within a computer environment under certain direct grouping scenarios. Data flow is a computer concept which may be considered as analogous to improvements based on assembly lines in mechanical systems. Based on data flow concepts, each computer environment includes a number of processes that are handled by a set of nodes. If certain nodes can interface more concurrently in performing their individual tasks that are included in a larger computer process, then the computer environment in general will be able to decrease its time to perform the entire larger process. The embodiment of the hash groupby node 106 as described with respect to FIGS. 1, 2, and 3 can in many instances reduce the time necessary to group distinct rows of data.

One illustrative example of pipelining involves the laundry washer and the dryer. Suppose that it requires an hour for a washing machine to wash a load of clothes, and another hour for a dryer to dry a washed load of clothes. To both wash and dry a single load of laundry (in which the clothes are dried after they are washed) requires two hours. By comparison, by using pipelining concepts, if ten loads of laundry are washed and dried using the same set of washer and dryer, then the entire process requires eleven hours (ten hours to wash all 10 loads almost-concurrently with ten hours to dry all 10 loads, plus the one-hour stagger time until the first washed load could be put in the dryer). This performing of tasks concurrently can be considered as pipelining.

The washer/dryer example above that washes ten loads of laundry presumes that the washing machine is a non-blocking process. The non-blocking process permits the concurrent use of the washing machine and the dryer. Consider the instance where the washing machine is acting in a blocking fashion where the clothes are not provided from the washing machine until all of the clothes are washed. With ten loads of laundry being washed in a washer-dryer combination where the washing machine is acting as a blocking device would require 20 hours. All of the washing would have to be performed prior to all of the drying! In the exemplary laundry example, the use of non-blocking devices results in a considerable time savings over blocking devices.

This disclosure provides a number of grouping mechanisms 102 by which input rows of data 104 can be grouped using a hash groupby node 106 into groups of rows of data 308. Each group of rows of data 308 as grouped by the hash groupby node can thereupon be stored as a single row in some buffer in linked-lists formed from buffers 312. A number of buffers 312, each containing rows of data, each storing data relating to the same group of rows of data, 308 can be associated as a linked-list of buffers 316. The use of linked-lists is generally known in software programs such as C, C++, Pascal, etc., and their general operation will not be further detailed herein.

The present disclosure describes a number of embodiments of the hash groupby node that is configured as a non-blocking node (or at least non-blocking for distinct groups of data). By making the hash groupby node non-blocking for direct input rows of data as described in this disclosure, concurrency with the non-blocking node following the hash groupby node 106 (referred to as the "consumer" non-blocking node 103a in FIG. 1) that consumes the output of the hash groupby node as an input is improved based on the pipelining and data flow concepts.

FIG. 2 shows one embodiment of a grouping mechanism 102 that includes the hash groupby node 106, and can group rows of data into groups as described in this disclosure. The hash groupby node 106 receives a number of input rows of data 104 that subsequently can be grouped into a number of groups. Each group is a row, containing the (distinct) common data parts (e.g. columns, or fields) from the grouped input rows, and possibly some aggregation data (e.g., an average of some numeric field in the grouped input rows). The hash groupby node 106 is non-blocking when no aggregation data is collected; in this mode of operation, it returns output of distinct rows of data 209, and filters out recurring rows of data 204.

This disclosure describes a number of grouping mechanisms as described with respect to FIGS. 1, 2, and 3 in which recurring rows of data are filtered out. The distinct rows of data are returned to the user substantially concurrently with the groupby node 106 receiving the input rows of data. This return to the user can improve the pipelining aspects within the computer process 101 by causing the nodes to perform more concurrently within the computer processes 101.

Figure 5:
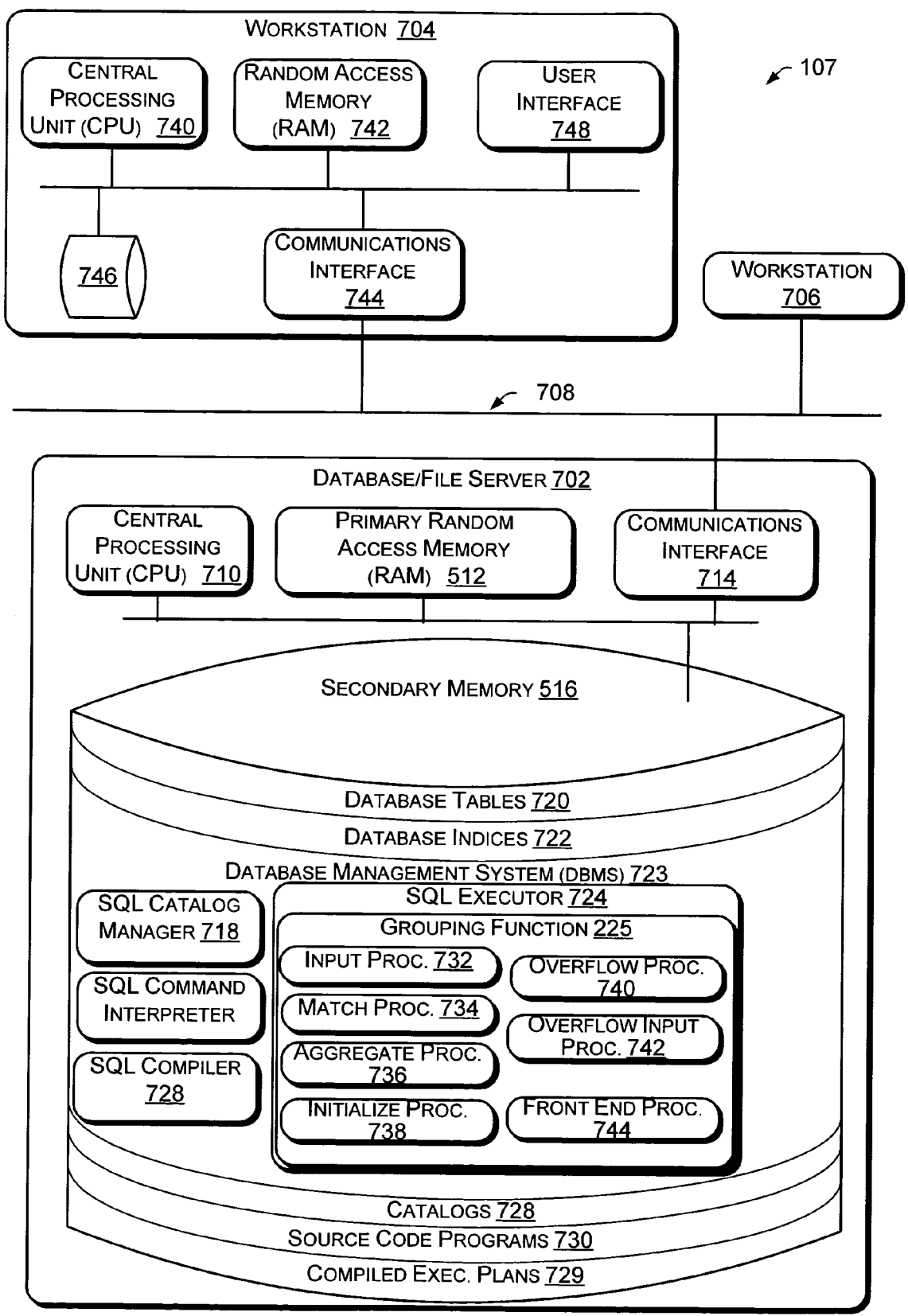
FIG. 5 is a block diagram of one embodiment of a computer environment on which the grouping mechanism such as shown in FIG. 1 can operate.

Certain portions of the stored group data 308 are flushed to an overflow mechanism as described in this disclosure when the amount of data stored in the primary memory (random access memory or RAM) 512 exceeds the size limits of that RAM, as described with respect to FIG. 5. Similarly, certain data will be returned from the secondary memory to the primary RAM or memory.

To summarize one aspect of the overflow mechanism by which clusters are initially transferred from the primary RAM to the secondary memory when the primary RAM is becoming filled, first the memory pressure is sensed. Then one of the clusters is picked to be spilled. Third, that cluster is spilled to secondary memory.

One aspect of the recent disclosure relates to how the rows of data are grouped, clustered, and/or buffered. Each group of rows of data 308 can fit into only into some single cluster 110. Each cluster in turn likely contains a number of groups. As such, all of the groups can be considered as being distributed among a number of clusters 110.

Each cluster 110 physically stores its groups of rows of data into a linked-list of buffers 316. Each cluster 110 also includes its own hash table 210, which the grouping mechanism can use to determine in which buffer location a particular group 308 is located. The grouping mechanism 102 can thereby involve hashing, grouping, and/or clustering aspects as described within this disclosure.

Certain aspects of the present disclosure involve the grouping mechanism receiving input rows of data 104, filtering out recurring input rows (e.g., using hash tables 210), and concurrently returning distinct rows to the user. Using a grouping mechanism 102 that returns many distinct rows of data can be used to quickly provide a meaningful response to a user's database query.

As such, if a computer environment 107 as described with respect to FIGS. 1 and 5 is queried to look for distinct rows of data, then the embodiment of the grouping mechanism 102 as described with respect to FIGS. 1, 2, and 3 is configured to return the results of the query soon after receiving each row of data that satisfies the query (instead of waiting to process all of the rows of data in the database prior to starting to return any data). This technique of handling the distinct rows of data in a non-blocking fashion can result in rapid return of rows of data to the user.

Another aspect of this disclosure involves the grouping mechanism 102 being configured to accommodate a memory overflow mechanism. Random Access Memory (RAM) as described below with respect to FIG. 5 is divided into a primary RAM 512 and a secondary memory 516. Within this disclosure, overflow is considered as writing data from one form of memory (primary RAM 512) to another form of memory (secondary memory 516) as the first form of memory fills up or approaches filling up.

In one embodiment, the primary RAM 512 is configured to store the groups of rows of data 308 until further processing can be performed, or until an overflow situation occurs as the whole node (in this instance the hash groupby node) runs out of memory space. The data from the hash groupby node 106 can be divided between a number of clusters 110. Clusters 110 are the unit of overflow, which means that in an overflow situation, all of the rows/groups of a certain cluster are moved to the secondary memory (after which the current hash table is discarded). At this time, that cluster is considered spilled. Typically each buffer has a fixed size. During the memory overflow process 740 as shown in FIG. 5, certain rows of data stored within the cluster's buffers 316 are moved from within the primary RAM 512 to the secondary memory 516 to alleviate memory pressure on the primary RAM.

Non-blocking of distinct rows of data (distinct rows grouped within groups contain all of the data of that group) can use a hash table 210. Within this disclosure, many embodiments that provide for non-blocking of distinct rows of data also provide for memory overflow. Blocking may be considered as limiting access of the user to data within a database until after all the rows of data within the database have been processed. Using the non-blocking feature as described in this disclosure, the user gains access to each row of data soon after (i.e., concurrently) it is grouped instead of having to wait until all of the rows of data in the entire database relating to the query are analyzed and processed. The non-blocking feature for distinct rows within the grouping mechanism improves the data-flow processing model for the groups of rows of data and clusters.

One embodiment of the non-blocking feature as described within this disclosure provides at least three advantages:

1. Before a memory overflow occurs, each distinct input row of data is processed in a non-blocking fashion. Each distinct row of data is thereby returned to the user concurrently to as it is received into primary memory and is grouped (as a group of one).
2. After an overflow occurs, while processing of some of the input is delayed (i.e., that of the spilled clusters), the processing to the input can be resumed sooner than with prior-art versions of grouping mechanisms in which the rows of data are blocked. The processing can occur while each overflow cluster is read back from the secondary memory (e.g., disk, tape, flash memory) back into the primary RAM 512 (and not at the end of the read).

3. In certain instances, where only a limited given number of distinct rows of data are requested in the query, the grouping mechanism (e.g., the hash groupby node) can finish its work without having to read and process the remainder of the input rows of data. One example of requesting such a fixed number of data rows exists by using for example a "SELECT_FIRST_N" command, where "N" represents the number of rows that is output with the query for certain versions of queries in Structured Query Language (SQL). An example of the SELECT_FIRST_N command is to select the first 12 distinct AUTHOR_NAME from BOOKS_TABLE.

With prior-art versions of the hash groupby node that were designed for aggregate rows, all the input rows have to be read and analyzed (in order to provide sufficient data for an aggregate grouping) prior to any rows being output to the user. This necessity to wait to read all of the rows of data exists even if only a prescribed number of output rows of data are requested by the query.

The non-blocking feature of certain embodiments of the grouping mechanism 102 for distinct rows of data can improve the execution performance of such database query languages as SQL In one aspect, a tree of nodes processes rows of data that can be accessed from the database in a pipeline fashion. To provide this pipeline functionality, input rows of data travel from the tree leaf nodes up to the tree root node, while most (ideally all) nodes can process concurrently. A number of mechanisms are provided in this disclosure by which affirmative responses to a query to a relational database can be provided on a concurrent basis as soon as they are located.

FIG. 3 illustrates one instance of how data can be grouped into clusters in one embodiment of grouping mechanism 102 using, e.g., a relational database. Relational databases in general are databases in which the data is arranged in tabular form, the configuration of the tables can be determined based on the particularly applied query. The groups of rows of data 308 are thereupon assigned to a cluster 110. In one embodiment, a cluster is evaluated to be selected for a specific group based on the term of equation 1:

hash value MODULO number of clusters          (equation 1)

where "hash value" is a number produced by a mathematical computation over all the data of the grouping fields; this is a known technique in computer programs to achieve a near-even distribution of entries over some range of numeric values.

This should distribute the groups substantially evenly over the clusters. As such, changing the hash value in a later phase to a new value would likely send two groups that belonged to the same old cluster in an earlier phase into two different new clusters. To clarify, two groups in the same cluster 110 usually don't have the same hash value (i.e., hash values are typically large such as 32 bit long, and therefore the possibility of duplicates is small). The two groups are typically co-located within the same cluster 110 when equation 1 produces the same result.

An illustrative library/book/author database example is used in this disclosure in which a database contains rows of data. Each group contains books written by the same author. Each input row contains data relating to a book, and the field/column to group by is the author name. The hash value can be computed by adding the letter codes of the author's name, each multiplied by some numeric weight.

Clusters of data 110 typically are smaller than the data contained within the non-blocking node such as the hash groupby node 106 (i.e., certain embodiment of the hash groupby node are sub-divided into clusters to improve processing). Certain embodiments of the grouping mechanism 102 of the present disclosure provide for grouping rows of data into groups 308, and subsequently a cluster 110. Within certain embodiments of this disclosure, each buffer 312 can store the same fixed number of groups. Grouping a large number of rows of data using the grouping mechanism 102 demands a considerable amount of processing time. This disclosure provides a number of grouping mechanisms by which meaningful results to queries seeking distinct rows of data can be provided to the user prior to processing through all of the data in the database. Such grouping mechanisms can improve data flow within computer environment under a number of scenarios. This output from the grouping is provided for each row more concurrently with the data being input.

Much of the complexity and associated time demanded to return any data associated with many prior-art database queries result from a computer environments 107 as described with respect to FIGS. 1 and 5 having to read and analyze all of the stored information (e.g., rows of data within even the largest databases) before any analyzed results can be returned to the user based on the original query.

There are many circumstances where the user running the query is more interested in obtaining some data relating to a particular query relatively quickly as compared with obtaining a complete compilation of all of the data that satisfies a query over a longer duration. Consider that in the library/book/author example, a user querying for any authors of some books represents a distinct query, with the books as rows, and the author name as the grouping field. In this query, the user is seeking a list of distinct authors within the library. With such queries, it would likely save the user time to provide any affirmative responses concurrently to (i.e., soon after) when the grouping mechanism 102 receives the row of data corresponding to the affirmative response. Having these responses returned on a piecemeal, but concurrent basis would likely be much preferred to having to process all of the rows of data in the database (e.g., search through all the books in the library) prior to returning any results to the user.

The present disclosure provides a variety of grouping mechanisms 102 in which certain rows of data that satisfy the queries are provided to the user concurrently to the grouping mechanism receiving the input distinct rows of data that satisfies the query. This return of the distinct rows of data to the user can occur considerably prior to the completion of the entire analysis or compilation of the query on all the data within the database.

While the querying, grouping, clustering, filtering, and other aspects of the grouping mechanism 102 as described with respect to FIG. 3 may theoretically be performed manually, many aspects of the grouping mechanism 102 can be applied to and performed by computing devices more effectively and reliably (especially for queries applied to large scale database systems).

Figure 4:
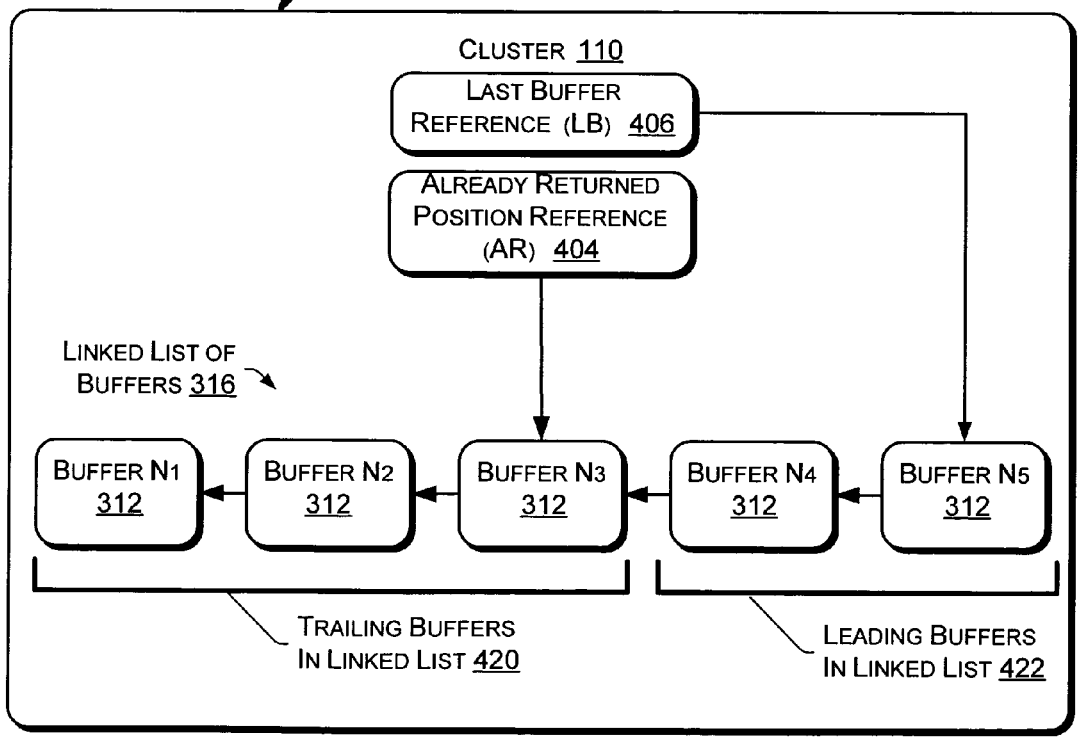
FIG. 4 shows a block diagram of one embodiment of a grouping mechanism that can group rows of data into a linked list of buffers.

The groups of data arranged within one or more of the clusters 110 (in clustered form) are subsequently stored in buffers 312 (often in linked list or other form) as shown in FIG. 3. In one embodiment, each cluster 110 stores its groups (rows of data) 308 physically within a linked list of buffers 316 as shown in FIGS. 3 and 4. Each cluster 110 includes its own hash table(s) 210 as described in this disclosure. The hash table allows the computing device to determine quickly where within the linked list of buffers 316 a particular group 308 is located. Distinct rows of data are grouped in groups of one. In other words, each group of rows of data represents a distinct row of data.

In one instance, each one of the groups of rows of data 308 (or group) as applied within the buffers 312 (in clustered form) represents a memory storage location having a prescribed size. Distinct rows of data that are returned to the user can be read, stored, or otherwise used by the user as desired.

While the employer/employee and library/book examples are illustrative examples of the operation of the database within this disclosure, it is to be understood that similar concepts are considered non-limiting and can be applied to a variety of similar database query applications such as product/owner, producer/consumer, etc. As such, all examples of the grouping mechanism 102 as described within this disclosure are intended to be illustrative in nature, and not limiting in scope.

FIG. 4 shows one aspect of how the groups of rows of data within a cluster 110 as shown in FIG. 1 can be added to buffers 312 including rows of data. As shown in FIG. 4, the buffers 312 including rows of data can take the form of a linked list of buffers 316. The linked list of buffers 316 include a plurality of buffers 312 labeled $N_1$, $N_2$, $N_3$, $N_4$, and $N_5$. Linked lists can be produced using known programming constructs with such programming languages as Pascal, C, and C++ (all of which are commercially available). Note that the lower the number of the buffer, the earlier the rows of data were originally written in the buffer within the primary RAM 512 as described wither respect to FIG. 5.

The cluster 110 as shown in FIG. 4 includes at least two references (which may include pointers, references, numbers, etc.). The Already Returned (AR) reference 404 points to the last buffer that that cluster had at the (first) time that cluster was selected to be spilled. All the groups in all the buffers up to that point were already returned (e.g., to the "consumer" node, in FIG. 1). The Last Buffer Reference (LB) 406 points to the last buffer 312 in the buffer list where groups of rows of data have been written (i.e. the "head" of the list.) Initially, before a cluster is spilled, the AR reference 404 is set to a negative value (e.g., −1) below any buffer's number, thus it is always true that the LB number is greater than the AR number.

One embodiment as now disclosed improves the execution performance of SQL. A tree of nodes processes rows from the database in a pipeline fashion; input rows travel from the non-blocking tree node 103a up to the root node 103a as shown in FIG. 1, while most (ideally all) non-blocking nodes 103a, 103b work concurrently. A blocking node (like prior-art versions of the hash groupby node described in the above incorporated Sharma et al. patent) takes a significant toll on concurrency. As mentioned above, the present disclosure provides for a non-blocking node that allows for the concurrency.

Certain embodiments of the present disclosure as now described accommodate the memory overflow mechanism generally with respect to FIGS. 6a, 6b, 6c, and 6d. Within the memory overflow mechanism, some of the groups in the cluster are flushed to disk to alleviate memory pressure. Using the overflow mechanism, the grouping mechanism 102 (e.g., including the hash groupby node) thus handles a memory pressure situation by overflowing. When memory pressure is sensed, one of the clusters is picked and then its buffers 312 are spilled from the primary RAM 512 to the secondary memory 516 (e.g., disk).

In certain embodiments of the present disclosure, the grouping mechanism 102 is prepared to handle a memory pressure situation by overflowing. When a cluster 110 is spilled in the first time, all its buffers 312 as described with respect to FIG. 4 are written to disk (in reverse order) and deallocated. Thereupon, the cluster 110 shifts to the "spilled" status, from which point and on it uses only a single buffer (and a smaller hash_table) within the primary RAM 512. The next time that cluster is spilled is when its (only) buffer 312 becomes full. When memory pressure is sensed, one of the non-spilled clusters 110 is picked and then its buffers 312 are spilled from the primary RAM 512 to the secondary memory 516. Once a cluster 110 becomes spilled, it may start collecting duplicate groups (because the buffers 312 on disk can not be checked.).

After all the input to the hash groupby node 106 is read, that last buffer 312 in each spilled cluster 110 is flushed to the secondary memory 516 (no copies of the flushed data are maintained in the primary RAM 512). The hash groupby node 106 then processes the spilled clusters, one at a time, similar to the way the original input was handled. In this manner, a fresh clean new set of clusters 110 are created in the primary RAM 512, and each row/group from the spilled cluster is read (in a manner similar to input reading) and hashed again into one of the new clusters (with a modified hash value, otherwise all the rows would end up in the same cluster. This can be done by storing each old hash value along with its group, then when that group is read back from secondary storage, a fixed mathematical permutation is applied to yield a new hash value.).

Each buffer 312 that is written to the secondary memory 516 is assigned a "position number". In one embodiment, these position numbers are ascending numbers, from 1 and up, used as "on disk" references/references to the buffers 312. The −1 (or zero) is the NULL value for those positions.

Overflow in a cluster 110 creates special problems due to potentially duplicate entries. As the cluster 110 spills for the first time (as a result of overflow), new input rows from that cluster 110 can not be immediately returned (to the "consumer" or user) because there may be a matching group in the buffers 312 on the secondary memory 516. Thus after all the input is read, each spilled cluster has some rows that were already returned to the user as output, and some rows that still may need to be returned to the user. These two types of rows have to be differentiated for the correct operation of the hash groupby node: Only (and exactly) those groups that have not yet been returned should be returned.

The mechanism that provides for the return of the correct (i.e. those not yet returned) groups of rows of data considers the order of the buffers 312 in the linked list of buffers 316 (as described with respect to FIG. 4) and the granularity of the spilling of the buffers 312. In one embodiment, whole buffers 312 are spilled, thus no buffer can ever become "partially spilled". As such, individual rows need not be marked as "already returned", but instead only the position of the last buffer containing rows that were already returned is memorized.

When a cluster's 110 first spill happens, an alreadyReturnedPosition (AR) reference or pointer 404 (as described with respect to FIG. 4) is provided within the cluster to identify the last buffer 312 in the linked list of buffers 316 whose rows were already returned as they were read. Prior to the first spill, the AR reference 404 is assigned a value of "−1". Following the first spill, the AR reference 404 is set to reference the last buffer that was returned to the user. After that first spill, no more (new input) rows would be returned to the user from that cluster 110 until some later phase following the completion of reading the input.

Considering FIG. 4, those buffers 312 of the linked list of buffers 316 that contains data that has been returned to the user are referred to as the trailing buffers of the linked list 316 (i.e. the "tail" of the list). The trailing buffers 312 of the linked list 316 are located between (inclusive) the buffer pointed to by the AR pointer (the buffer referenced as $N_3$ in FIG. 4) and the first buffer produced in the linked list (the buffer referenced as $N_1$ in FIG. 4). Those buffers 112 in the linked list 316 of buffers that have not been returned to the user are referenced as the leading buffers of the linked list 422 (i.e., the "head" of the list). The leading buffers 422 include inclusively those buffers 312 between the buffers pointed to by the last buffer reference (LB) 406 (the buffer referenced $N_5$ in FIG. 4) and the buffer next to the buffer referenced by the AR pointer (the buffer referenced to as $N_4$ in FIG. 4)

Thus after all the input is read, a spilled cluster 110 would point to a linked list of buffers 316 (contained within the secondary memory 516). Only the trailing part of the linked list of buffers 316 was returned. Following processing, the groups in the leading buffers in the linked list 422 may be returned to the user (i.e., only those without a duplicate group in some prior buffer). By comparison, the groups in the trailing buffers in the linked list 420 have already been returned to the user, and therefore these groups 308 will not be returned to the user following the processing. The trailing part of the linked list of buffers 316 therefore starts at the buffer 312 pointed to by the AR field or buffer 404, ending at the end of the linked list of buffers 316. The head 317 of the linked list of buffers 316 as shown in FIG. 3 starts at the LB reference 406, and ends at the last buffer 312 before the buffer pointed to by the AR field 404 as shown in FIG. 4.

The last buffer (LB) reference 406 marks the last buffer 312 ($N_5$ as shown in FIG. 4) of the linked list of buffers 316 that was used by this cluster 110 to hold groups (i.e., using the "head" of the buffer list 317). Note as shown in FIG. 3 that the last buffer (on the left side) of the linked list of buffers 316 still has space for more groups, while the trailing older buffer (on the right side) of the linked-list of buffers is completely filled. If no groups are added to the cluster from the first time it was spilled until the last input row was processed, then the buffer referenced by the LB reference would be the same buffer in the linked list 420 that is also referenced by the AR reference 404. In such a (rare) case, this spilled cluster has no more groups to return and can be safely discarded; all other spilled clusters would need further processing to handle their remaining unreturned groups.

Those buffers 312 that are written from the primary RAM 512 to the secondary memory 516 as described in certain embodiments of the present disclosure are assigned incrementally ascending positive numbers (e.g., $N_1$, $N_2$, . . . , $N_J$, . . . $N_K$ similar to what is illustrated in FIG. 4). Thus, if K>J, then a buffer 312 that is numbered $N_K$ has been written to secondary memory 516 later than another buffer 312 numbered $N_J$.

Another overflow mechanism is now described by which those clusters 110 as shown in FIG. 3 that were spilled from the primary RAM 512 to the secondary memory 516 can be read back into the primary RAM 512 and processed. All the clusters 110 that were spilled into the secondary memory 516 are read back one cluster at a time; each group is read as an input row 104. To read those rows of data that have been spilled back from the secondary memory 516, the trailing part of the linked list of buffers 316 (which starts at the buffer pointed to by alreadyReturnedPos reference 404) is read first.

After all the original input rows 104 are read and processed, those clusters 110 where all the rows have been returned to the user (or "consumer") are discarded (these are the never spilled clusters and those rare clusters that were spilled once but where no new group was added after that initial spill; i.e. where the AR and LB refer to the same buffer.) For the remaining (spilled) clusters 110, all their remaining primary memory buffers 316 are also written to secondary memory 516.

The implementation of the correct reading of a cluster's buffers 312 in the linked list of buffers 316 as described with respect to FIGS. 3 and 4 relies on the use of the buffers' position numbers. The buffers 312 are started to be read at the alreadyReturnedPos reference 404 position, and are continued to be read in a descending order until the end of the list is reached. At this point, all the groups that where previously returned to the user have been read and processed, thus the state of the original cluster 110 was reconstructed to the point when it was first spilled. In one aspect, the reading process skips back to the head of the buffer list (LB) to read the leading buffers, reading all the rows of data in the buffers 312 of the linked list of buffers 316 from the primary RAM 512 until the buffer at the alreadyReturnedPos reference 404 position is encountered, and then that cluster is finished being read as input 104 into the new set of clusters 110.

The rows read from the spilled cluster are processed is the same way as regular input rows 104, except for a comparison of the current buffer position with the "alreadyReturnedPos" reference 404. If the row came from a buffer whose reference number is higher than the reference number (i.e. position) of "alreadyReturnedPos" 404, and this row is the first one of its group (i.e. not found in the hash table 210), then this group is returned to the user (or "consumer"). Otherwise if the row came from a buffer whose reference number is not higher than the reference number of the "alreadyReturnedPos" 404, then this row's group is entered in the appropriate buffer 316 and hash table 210 however not returned to the user because this row was already previously returned.

While reading back a large spilled cluster as input rows 104, the primary RAM 512 may become filled again and some of it would need to be spilled again. This is handled quite neatly because before each spilled cluster is read, the grouping mechanism 102 is preparing a fresh new set of clusters; hence each new cluster would have its own alreadyReturnedPos value. These new clusters that are being spilled will be added to the list of overflowed clusters, behind those overflowed clusters that were in the process of being read into the hash table 210. As such, these new clusters 110 are subsequently handled using the same mechanism.

The size of the primary RAM 512 is a consideration in the present disclosure. If the primary RAM 512 does not shrink during the above-described processing of the grouping mechanism 102, then the grouping mechanism is acceptable because the overflow from the primary RAM 512 to the secondary memory 516 would occur only after the trailing part of the linked list of buffers 316 was handled.

However if the size of the available primary RAM 512 shrinks significantly during the processing of the grouping mechanism 102 whereby a "secondary" overflow may occur before the trailing part (i.e. those "already returned rows") was completely handled, then the alreadyReturnedPos of some new cluster may be set too "early", causing some rows to be eventually returned twice (i.e., some "already returned rows" may be stored in the buffers following the new alreadyReturnedPos reference.). The size of primary RAM available to the hash groupby node 106 may shrink at any time. For example, when several nodes are operating together in a concurrent fashion, and all of the nodes share a centralized memory pool (such that each node can ask for memory on demand, and return "no longer used" memory to that memory pool), then the "already returned" portion of the buffer list (for which previously the primary memory size was sufficient) may become larger than the size of the available primary memory.

To solve this shrinking primary RAM problem, the position numbers should be checked when the decision about the secondary memory 516 overflow is made. If the current reading position is in the trailing part of the linked list 422 as shown in FIG. 4, then the overflow (to the secondary memory) would be delayed. Assumed here is the existence of a virtual memory mechanism, which is a standard mechanism (used by many modern commercially available computer operating systems whose operation is generally well understood) that relieves pressure from the primary memory by writing portions back to secondary memory. A virtual memory mechanism is very inefficient in comparison to the overflow mechanism, and as such it would only be used temporarily to guarantee the correctness of the grouping mechanism 102 in the case of shrinking primary memory.

As described with respect to FIG. 5, the database server 702 includes a central processing unit (CPU) 710, the primary RAM 512, a communications interface or input/output 714 for communicating with user workstations 704, 706 as well as other computer environment resources. A secondary memory 516 (often a magnetic disc storage in many embodiments) can be located in the database server 702 in a manner that stores database tables 720, database indices 722, a database management system (DBMS) 723 for enabling user and operator access to the database tables, and/or one or more catalogs 726 for storing schema information about the database tables 720 as well as directory information for programs used to access the database tables. The secondary memory 516 also allows for data overflow from the primary RAM 512. The DBMS 723 includes an SQL executor 724 that includes a grouping function 725 (as described with respect to FIGS. 1, 2, and 3) as well as other database management subsystems such as an SQL catalog manager 718 and an SQL command interpreter.

The embodiment of the database management system (DBMS) 723 as described with respect to FIG. 5 also includes a SQL compiler 728 for compiling source code database query programs 730 into compiled execution plans 729. The grouping function 725, which implements the hash grouping method of the present invention, includes an input procedure 732, a matching procedure 734, an aggregation procedure 736, an initialization procedure 738, an overflow procedure 740, an overflow input procedure 742, and a front end procedure 744.

Typically, each end user workstation 704, 706 includes a central processing unit (CPU) 740, memory 742, a communications interface or input/output 744 for communicating with the database server 702 and other computer environment resources, a secondary memory 746, and a user interface 748. The user interface 748 typically includes a keyboard and display device, and may include additional resources such as a pointing device and printer. Secondary memory 746 is used for storing computer programs, such as communications software used to access the database server 702. Some end user workstations 706 may act as "dumb" terminals that do not include any secondary memory 746, and thus execute only software downloaded into memory 742 from a server computer, such as the database server 702 or a file server (not shown).

One aspect of this disclosure relates to overflow. During non-overflow situations, the clusters/groups or rows of data as described with respect to FIG. 3 are normally stored in the primary random access memory (RAM) 512 as described with respect to FIG. 5. The primary RAM 512 can thus be considered as one physical buffer memory that "buffers" the rows of data. Overflow occurs when the volume of data that is actually contained in the clusters 110 contained in a physical buffer in the primary RAM 512 approaches and/or exceeds the volume of data that the physical buffer within the primary RAM 512 can actually store.

This disclosure provides a number of overflow mechanisms by which some of the clustered rows of data 110 are written from the primary memory 512 into the secondary memory 516 (e.g., a disk). Generally, it is envisioned that the secondary memory 516 is a slower type of memory that can store more data than the primary RAM 512 (although this does not have to be true). In an overflow situation, any percentage of the clusters of rows of data 110 can be written to the secondary memory 516 while the remaining percentage of the clusters of rows of data can be stored in the primary RAM 512. The clusters of rows of data 110 provide one measure of overflow since all the rows of data in each entire cluster can be transferred from the primary RAM 512 the secondary memory 516 as described with respect to FIG. 5. When the grouping mechanism 102 runs out of space in the primary RAM 512, it overflows into the secondary memory 516 (e.g., disk memory) by flushing one of its clusters into the secondary memory 516 and releasing its buffers within the primary RAM 512. The buffers can be located either in the primary memory 512 or in the secondary memory 516.

One embodiment of a grouping mechanism 102 for grouping distinct rows of data as shown in FIG. 2 is now detailed within a grouping process 600 as described in block diagram form with respect to FIGS. 6a, 6b, 6c, and 6d. Aggregate rows of data 204 can be handled as described by the above incorporated patent to Sharma et al.

There are three types of clusters that are mentioned with respect to a grouping process 600 as described in FIGS. 6a, 6b, 6c, and 6d. One type of cluster is considered the "current cluster", where the currently handled row/group belongs. The current cluster is the most commonly mentioned cluster within the grouping process in FIGS. 6a, 6b, 6c, and 6d. Another type of cluster, that is referred to herein as a "selected" cluster is picked for the spilling operation as referenced in operation 626 of the grouping process of FIGS. 6a, 6b, 6c, and 6d. Yet another type of cluster is referenced to as an input cluster. When handling spilled clusters one at a time as input, the input cluster is the spilled cluster that is currently being read from the secondary memory. The portion of the grouping process 600 within FIG. 6c, as well as decision 630, refer to the attributes (e.g. alreadyReturnedPos (AR), last buffer (LB)) of the "input" cluster, not the current one.

The grouping process 600 includes an operation in which each cluster from the set of cluster is initialized. The grouping process 600 encounters decision 606 in which it determines whether the end of the (original) input 104 was reached. If the answer to decision 606 is yes, then the grouping process 600 continues to operation 648 as described below in which preparations are made to read and process spilled clusters (if any exist).

If the answer to decision 606 is no, then there are more input rows 104 to read, and the grouping process 600 continues to the operation 604. In the operation 604, a new row of data is read into the primary RAM 512.

The grouping process 600 continues to operation 608 in which the hash value for the row's group is calculated. The hash value is used to quickly determine the appropriate cluster for this group (e.g., by calculating the mathematical modulo of this value by the number of clusters) and to find the location of that group (if exists) in that cluster's buffers (by using the cluster's hash table 210).

The grouping process 600 continues to decision 610 in which it is determined whether the input row's group exists in the cluster. If the answer to decision 610 is yes, then the grouping process 600 continues to operation 634 as described below.

If the answer to decision 610 is no (i.e., a new group was discovered), then the grouping process 600 continues to decision 612 in which it is determined whether the cluster has a buffer, and space within that buffer, to store the new input row. If the answer to decision 612 is yes, then the grouping process 600 continues to operation 627 in which the new group is inserted into that buffer (i.e., at the head of the buffer list) of the cluster (and into the cluster's hash table 210).

If the answer to decision 612 is no, then the grouping process 600 attempts to reallocate new buffer space. Negative results from the decision 612 results in the grouping process 600 continuing to decision 614 in which it is determined whether the cluster has already been spilled. If the answer to decision 614 is yes, then the grouping process 600 continues to decision 615 in which it is determined whether the cluster has a buffer. If the answer to decision 614 is no, then the grouping process 600 locates new buffer space by continuing to operation 618 in which new buffer space for the current cluster is attempted to be allocated.

If the answer to decision 615 is yes, then the grouping process 600 continues to operation 616 in which the last buffer (which must be full, see 612) of that spilled cluster is written to the secondary memory 516, and the grouping process continues to allocate new space in operation 618. If the answer to decision 614 is no, then the grouping process 600 alocates new buffer space by continuing directly to operation 618 in which new buffer space for the current cluster is attempted to be allocated. In operation 618, a new buffer is attempted be allocated for the current cluster. The term "attempt" as referred to in operation 618 means: "Succeed only if enough primary RAM is available, without resorting to the use of virtual memory" (most computer systems of the type that would run the grouping mechanism include some virtual memory). With virtual memory mechanism, pages are moved to secondary memory 516 automatically as the primary memory pressure builds up. However, this automatic transfer mechanism is significantly inefficient when handling large databases.

The grouping mechanism 102 is very efficient in managing the primary memory and deciding what to spill to secondary memory or read back from there (in comparison to the virtual memory mechanism). However there is a rare situation where the virtual memory mechanism may be used for a short period of time. This happens when the primary RAM available to the grouping node 102 shrinks while a spilled cluster is being processed again (i.e., read as input), and not enough space is available to hold the trailing part of that cluster's buffer list. A "secondary overflow" (i.e. overflow of a new cluster) at this point may violate the assumption about the AR reference (because there may still be "already returned" rows after that AR's buffer). A simple way to solve this situation is by resorting to the use of the virtual memory mechanism; the following mechanism as shown in Pseudocode Segment 1 is used:

Pseudocode Segment 1: Shrinking Primary RAM Mechanism:

If reading from an Overflow Buffer (i.e., processing a spilled cluster not from the input);

And the number of that buffer is less than or equal to the AlreadyReturned Position (AR) reference value (i.e., the current buffer being read is within the already returned rows);

Then (the then operator acts to delay the overflow):

Allocate a new buffer without checking the availability of the primary memory (i.e., this always succeeds, but may rely on the virtual memory).

The grouping process 600 continues to decision 620 in which it is determined whether the attempt to allocate a new buffer (in which the distinct row can be stored in) to the current cluster in operation 618 was successful. If the answer to the decision 620 is yes, then the grouping process 600 continues to operation 627 as described below. If the answer to the decision 620 is no, then the grouping process 600 continues to decision 622 where it is determined whether any non-spilled cluster remains in the primary RAM 512, so its memory could be freed. If the answer to the decision 622 is no, then the grouping process 600 fails for lack of memory (and can terminate).

If the answer to the decision 622 is yes, then the grouping process 600 continues to operation 626 in which some further space within the primary RAM 512 is acquired by spilling some non-spilled cluster to the secondary memory 516. In operation 626, any non-spilled cluster is selected (randomly or otherwise), and the contents of the non-spilled cluster are written to the secondary memory 516 by: a) marking the cluster as spilled; b) writing all of buffers 312 within the cluster to the secondary memory 516; and c) setting the "already returned" reference 404 in the cluster to the current last buffer in the linked list. It is preferred to select the current cluster (if non-spilled) because its last buffer is filled at this point. All of the buffers 312 in the linked list 316 that were written prior to (and including) the "already returned" reference (i.e., the trailing part) will now be contained within the secondary memory 516.

Following operation 626, the grouping process 600 continues to 618 (and loops through operation 618, decision 620, and so forth) as described above in which there is an attempt to allocate new buffer space within the primary RAM for the distinct row of data read into primary memory in operation 604 that is included in the current cluster.

In operation 627 (which can be reached by a yes response from either decision 620 or decision 612 as described above), the grouping process 600 inserts the new group including the distinct row of data into the last buffer of the cluster, and marks its location in the hash table 210. Each cluster references a linked list of the buffers 316, and includes the hash table 210 as shown in FIG. 3.

Attempts to determine whether the current row of data should be returned based on whether the current row of data is in the trailing buffers in the linked list 420 as shown in FIGS. 3 and 4, and therefore already has been returned; or alternatively whether the current row being read is in a buffer that is in the leading buffers in the linked list 422 as shown in FIG. 4, and therefore has not been returned to the user. The determination of whether the current buffer is in the leading buffers in the linked list 422 or the trailing buffers in the linked list 420 is made in decision 630, in which it is determined whether the current buffer value (in the "input" cluster) is greater than the value of the Already Returned Positive Reference (AR) 404 (in the "input" cluster) as described with respect to FIG. 4.

Following operation 627, the grouping process 600 reaches decision 628 in which it is determined whether the current cluster is spilled. If the answer to decision 628 is yes, the grouping process 600 skips returning this row (because no more rows are returned after the current cluster became spilled) and continues to decision 634 to handle the next row. If the answer to the decision 628 is no, the grouping process 600 continues to decision 629 in which it is determined whether an original input row is being read (i.e., not reading from an "input" cluster).

In decision 629, the groupby node determines whether an original input row is being read. If the answer to decision 629 is no (i.e., reading from a previously spilled "input" cluster), then the grouping process 600 continues to decision 630 that determines whether the "input" cluster's current buffer reference number (i.e., the $N_1$, $N_2$, $N_3$, $N_4$, $N_5$, ...) is greater than the "input" cluster's already returned (AR) reference number as described with respect to FIG. 4. If the answer to the decision 629 is yes, then the grouping process 600 continues to operation 632 in which the current row is returned, A negative answer to the decision 630 (i.e., reading the trailing part of the buffer list of the "input" cluster) leads to decision 634 as described below. A positive response to decision 630 (i.e., reading the leading part) leads to operation 632, in which the new group is returned as an output.

Returning the new group as output in 632 indicates that the buffer referenced by the current buffer reference is in the leading buffers in the linked list 422 as shown in FIG. 4, and therefore has not been returned to the user. As such, this group is returned to the user in operation 632. So the buffers of the previously spilled "input" cluster were read from secondary memory in this order: Trailing part 420 of the list first, than the leading part 422. In this manner, the groups from the trailing part 420 are entered into the (buffers and hash tables of the) various new clusters, but not returned. Later, the rows/groups from the leading part are read and handled the same way as input rows 104: If a group is found to already exist at some new cluster (e.g., possibly came from the trailing part) it is not returned; alternatively the group is returned.

Operation 632 also handles the special case where only a limited number N of groups was requested by the user (i.e. SELECT FIRST N). In one embodiment, operation 632 counts the returned rows, and after N rows were returned, the work of the whole grouping process 600 terminates.

Following operation 632, or a negative response to decision 630, or a positive response to 628, the grouping process 600 continues to decision 634 which separates the processing of the "original" input rows 104 from the processing of rows that are read from an overflow buffer (i.e., from a previously spilled cluster that at this point serves as an "input" cluster. Decision 634, decision 636, operation 638, decision 640, operation 642, decision 644, operation 646, operation 648, operation 650, decision 652, and operation 658 together (as shown within FIGS. 6c and 6d) may be considered as the portion of the grouping process 600 related to one embodiment of processing of the overflow buffers 312 to return those groups from these buffers that have not been returned to the user as referenced by the cluster 110 (as shown in FIGS. 3 and 4).

A negative result from decision 634 causes the grouping process 600 to continue to decision 606 to process "original" input rows 104. A positive result from decision 634 causes the grouping process 600 (which indicates that the buffer being read is an overflow buffer) to continue to decision 636 in which it is determined whether the end of the current (overflow) buffer that is being read to the primary RAM 512 has been reached. If the answer to decision 636 is no, then the grouping process 600 continues to operation 646 in which the next row is obtained from the current (overflow) buffer.

If the answer to the decision 636 is yes, then the grouping process 600 continues to operation 638 in which the processing moves its focus (i.e. current buffer) to the next buffer in the buffer list of this "input" cluster. The process in operation 638 moves to the next buffer in the list as is commonly used in computer programs (i.e., in descending position order through the buffers 312 within the linked list 316 designated as $N_1$, $N_2$, $N_3$, $N_4$, and $N_5$ as shown in FIG. 4).

Following operation 638, the grouping process 600 continues to decision 640 in which it is determined whether the end of the buffer list of the "input" cluster has been reached. Decision 640 therefore determines whether the current overflow buffer is the last buffer referenced by the "input" cluster 110 (i.e. the last buffer read matches buffer $N_1$ in FIG. 4).

Figure 6A:
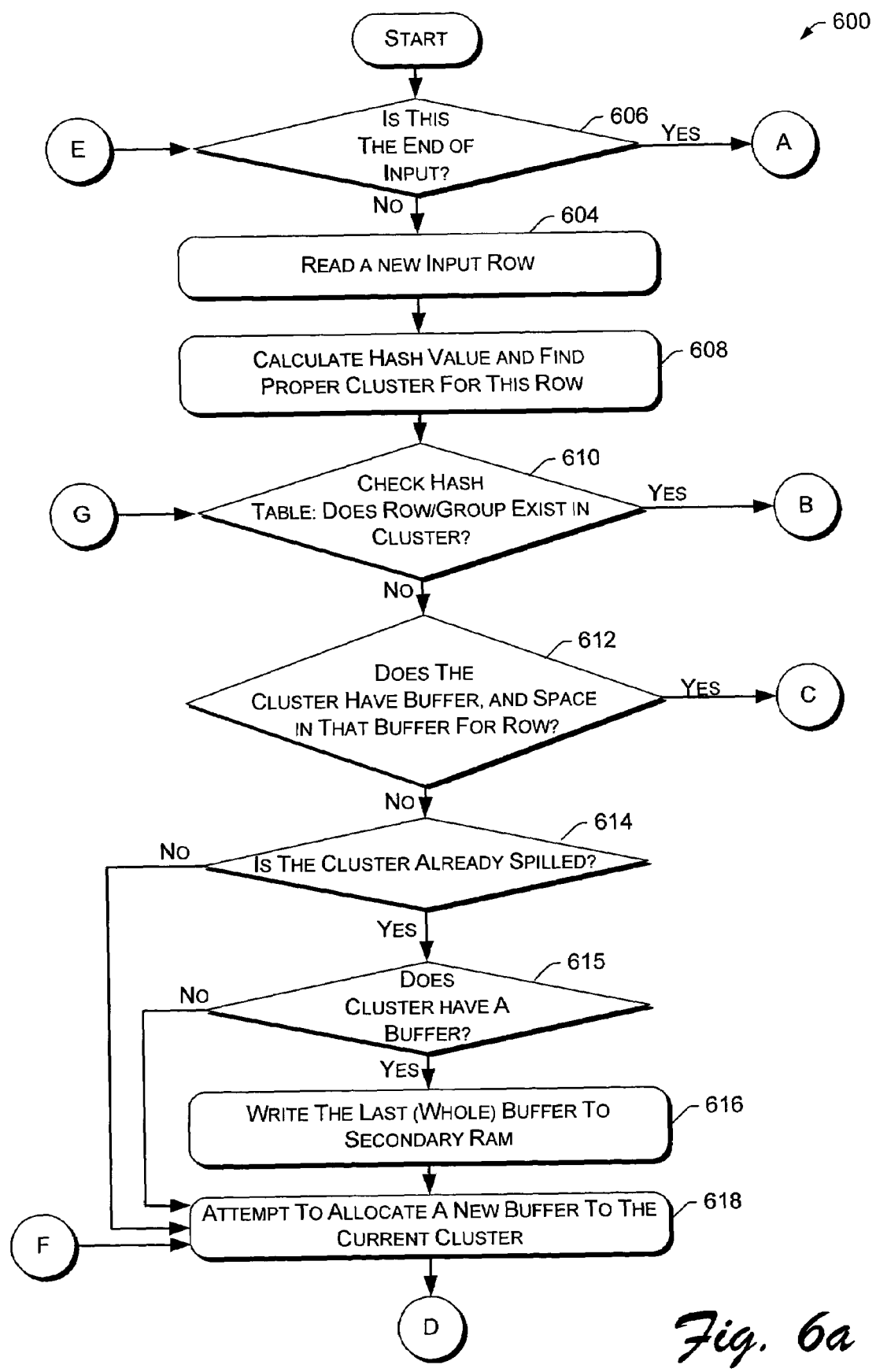
FIGS. 6a, 6b, 6c, and 6d show a flowchart of one embodiment of a grouping process that can run on the embodiment of the grouping mechanism as shown in FIG. 1.
Figure 6B:
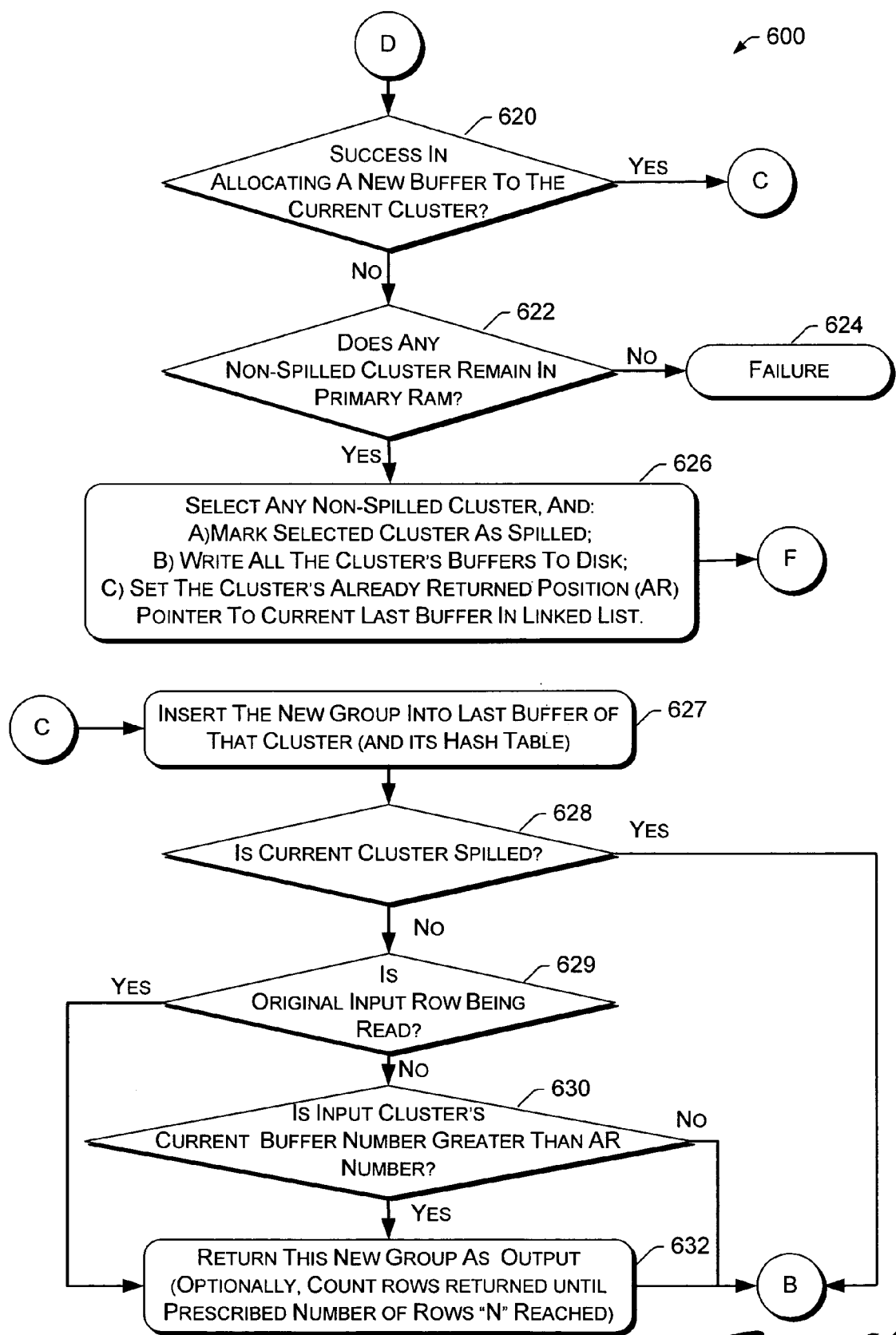
Figure 6C:
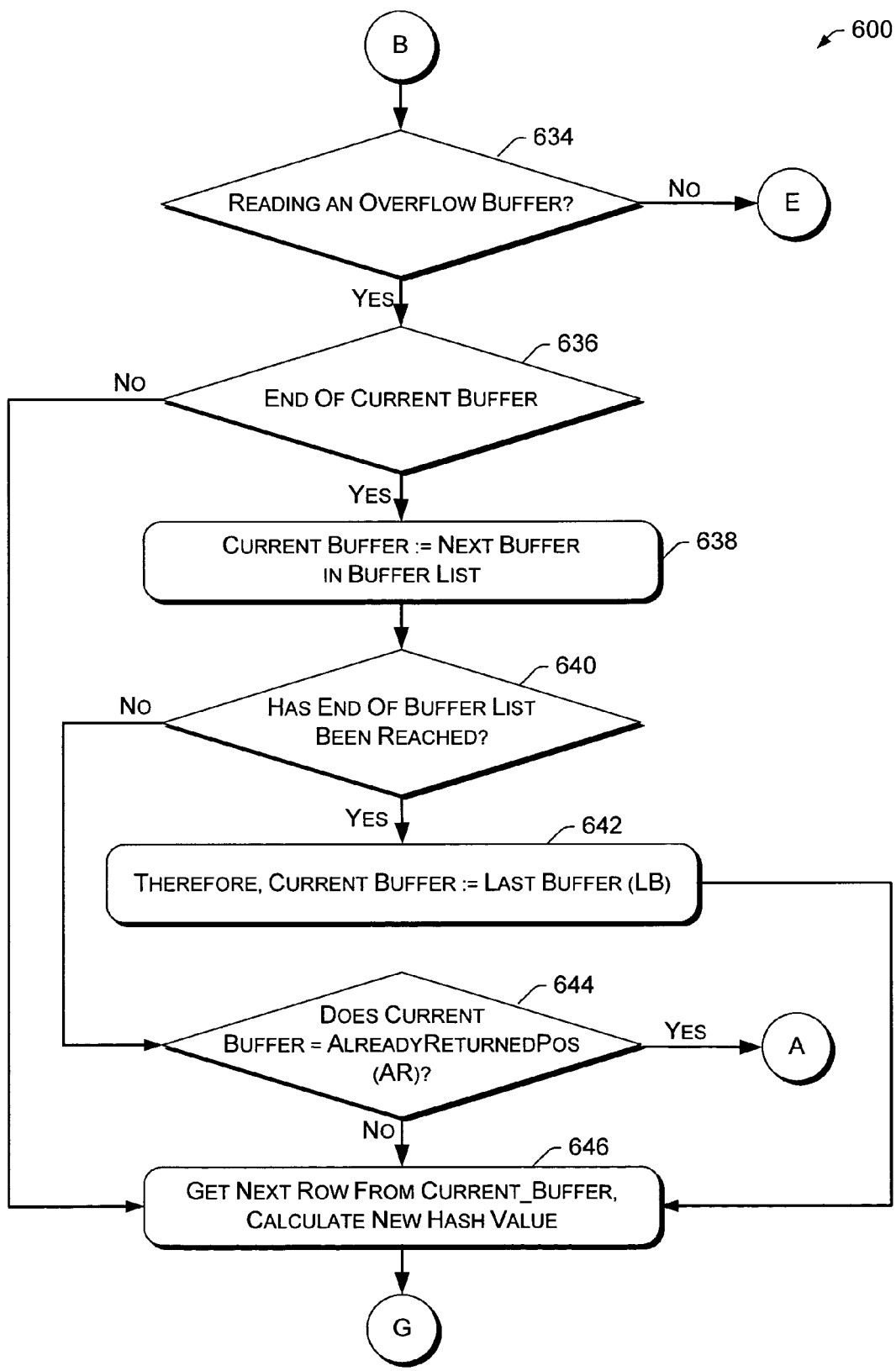
Figure 6D:
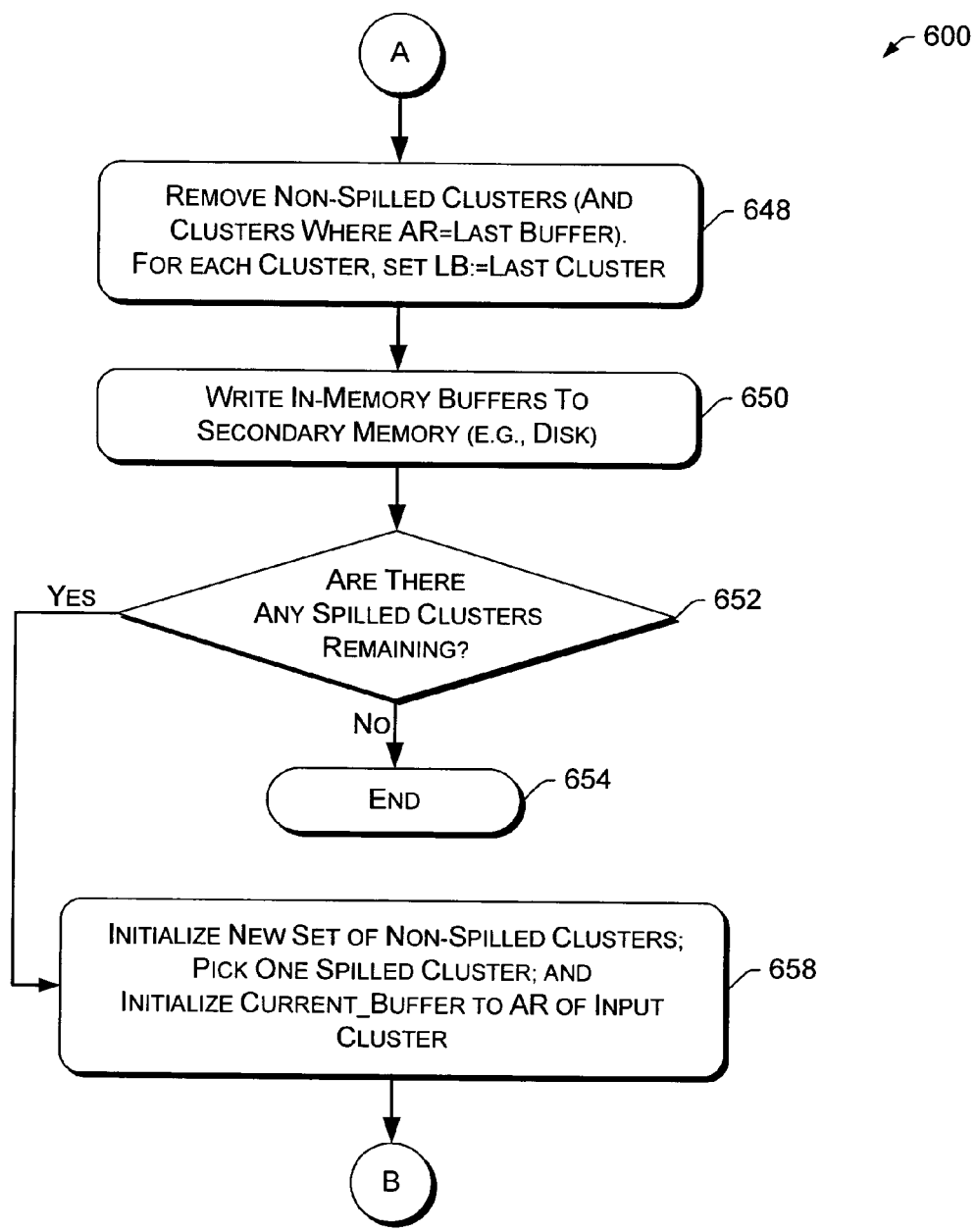

If the answer to the decision 640 is yes, then the grouping process 600 continues to the operation 642 (as shown in FIG. 6c) in which the current buffer is assigned the position of the last buffer (i.e., skipping to the head of the old buffer list, using the last buffer reference (LB) 406 as shown in FIG. 4). After the decision 640 returns a positive response and continues to operation 642 (indicating that the buffers within the cluster of the rows of data that are being processed are the leading part of the buffer list 422), then in one embodiment further processing of the not-returned rows of data will rely on (and loop through) operation 646 in which the next row is obtained from the current buffer. In operation 646, the hash value which is stored along with the row/group in the buffer is processed to obtain a new hash value. The reasons for this new hash value is that otherwise all the rows of the spilled "input" cluster would be mapped back to a single cluster (like they did when that "input" cluster was still current) which is inefficient and would cause an infinite loop in case of a "secondary" overflow. By using a "new" hash value for each row, the rows from the "input" cluster are likely to be spread evenly across the new set of current clusters. The cluster for that row/group is determined from that new hash value as described above.

If the answer to the decision 640 is no, then the grouping process 600 continues to decision 644 in which it is determined whether the current buffer is the buffer that is pointed to by the AlreadyReturnedPos (AR) reference 404 as described with respect to FIG. 4. A positive response to decision 644 (i.e., finished reading all the buffers of this "input" cluster) results in the grouping process 600 continuing to operation 648 in which the non-spilled current clusters (and those rare clusters where the AlreadyReturnedPos (AR) reference 404 points to the last buffer; i.e., no groups were added after the first spill) are removed (i.e., these clusters are no longer needed, as all their rows were returned). In operation 648, for each remaining (i.e., spilled) cluster, the LB reference 406 as described with respect to FIG. 4 is assigned the position of the last cluster. After operation 648, the grouping process continues to operation 650 in which the memory buffers remaining in the primary memory (i.e., of those spilled current clusters) are written into the secondary memory. At this point, all the buffers of all the (spilled) clusters are in secondary memory, including both the trailing 420 and leading 422 parts. Next, those spilled clusters would be processed, one by one, as an "input" to the grouping mechanism.

Following operation 650, the grouping process 600 continues to decision 652 in which it is determined whether there are any spilled clusters remaining within the secondary memory. If the answer to decision 652 is no, then the grouping process 600 ends in terminal 654. If the answer to decision 652 is yes, then the grouping process continues to operation 658 in which one spilled cluster is selected, and a new set of non-spilled clusters is initialized. In operation 658, the current buffer (i.e., the next overflow buffer to read rows from) is assigned to be the buffer which is referenced by the AlreadyReturnedPos reference 404 as shown in FIG. 4. Following operation 658, the grouping process 600 continues to decision 634 as described above.

FIG. 5 shows one embodiment of a computer environment 107 that can run application programs that act as a grouping mechanism 102 to run the grouping process 600 as described within this disclosure (to group and cluster rows of data in grouped rows of data in stored databases, and providing user access to the distinct rows of data substantially concurrently to receiving the distinct rows of data).

In one embodiment, the computer environment 107 is organized to include a plurality of computers 702, 704, 706 as a distributed or networked computer environment. The distributed or networked computer environment may include, e.g., local area networks, wide area networks, wireless networks, wired-networks, and/or any type of network configuration. The computer environment 107 generally includes at least one database server 702 and many use workstation computers or terminals 704, 706.

When a database stores a large amount of data into the primary RAM 512 in a computer environment 107, the data relating to tables within the database can be partitioned, and different partitions of the database tables will often be stored in different database servers. However, the database server 702 appears as a single entity relative to workstation computers 704, 706.

As such, after all of the input to the hash groupby node is read, the last buffer 312 in each spilled cluster is flushed to the secondary memory 516 (and no entries of data are kept in the primary RAM 512). Then, the hash groupby node processes the spilled clusters 110 from the secondary memory 516 to the primary RAM 516 one cluster 110 at a time, similar to how the original input rows 104 were read and handled. A whole fresh clean set of clusters 110 are created, wherein each row/group from the spilled cluster is read, a new hash value is computed (from the old value that was stored with the row) and placed again into one of the new clusters (if this group is new, which is the case for every row in the initially read trailing part 420, but not necessarily for all rows in the leading part 422, due to possible duplication). Note that each buffer written from the primary RAM 512 to the secondary memory 516 is assigned a position number (shown as $N_1$, $N_2$, $N_3$, $N_4$, and $N_5$ in FIG. 4). These reference numbers are used as reference pointers within the secondary memory (which is often in the form of a disk) to the buffers 312.

Although the invention is described in language specific to structural features and methodological steps, it is to be understood that the invention defined in the appended claims is not necessarily limited to the specific features or steps described. Rather, the specific features and steps disclosed represents forms of implementing the claimed invention.

The invention claimed is:

1. An apparatus, comprising: a non-blocking grouping mechanism that receives a query from a user, groups entries of data according to the query, and returns distinct entries of data to the user substantially concurrently with processing following grouping of data, wherein individual rows of data that match the query are output to the user prior to receiving all data matching the query.

2. The apparatus of claim 1, further comprising an overflow mechanism by which data that includes the groups of entries of data that were grouped by the non-blocking grouping mechanism can be written from a primary memory to a secondary memory when the primary memory reaches an overflow condition.

3. The apparatus of claim 1, further comprising: an overflow mechanism by which data that includes the groups of entries of data that were grouped by the non-blocking grouping mechanism can be written from a primary memory to a secondary memory when the primary memory reaches an overflow condition; and a return mechanism by which the data can be returned from the secondary memory back to the primary memory, and whereupon the data is being returned to the user substantially concurrently with the rest of the data being processed by the non-blocking grouping mechanism.

4. The apparatus of claim 1, wherein the primary memory includes a primary Random Access Memory (RAM).

5. An apparatus, comprising: a non-blocking grouping mechanism that groups entries of data, and returns distinct entries of data substantially concurrently with processing following entries of data to be grouped; an overflow mechanism by which data that includes the groups of entries of data that were grouped by the non-blocking grouping mechanism can be written from a primary memory to a secondary memory when the primary memory reaches an overflow condition; and a return mechanism by which the data can be returned from the secondary memory back to the primary memory, and whereupon the data is being returned to the user substantially concurrently with the rest of the data being processed by the non-blocking grouping mechanism; a select mechanism by which a prescribed number of output groups are requested by the user, wherein operation of all of the non-blocking grouping mechanism, the overflow mechanism, and the return mechanism are halted when the requested prescribed number of output groups is reached.

6. A method of providing concurrent grouping, comprising: receiving a query from a user; receiving input entries of data for the query; filtering out recurring entries of data from the input entries of data; and returning distinct entries of data from the input entries of data to the user substantially concurrently with the receiving input entries of data, wherein the distinct entries of data match the query and are returned to the user before all data matching the query is processed.

7. The method of claim 6, wherein the method accommodates memory overflow by selected portions of the entries of data in a primary memory being flushed to a secondary memory to alleviate memory pressure.

8. The method of claim 6, wherein the method accommodates a memory overflow, wherein clusters of entries of data are written from a primary memory to a secondary memory when the primary memory runs out of memory, and wherein the primary memory overflows into the secondary memory by flushing one of its clusters of entries of data into the secondary memory and releasing certain ones of its in-memory buffers.

9. The method of claim 6, further comprising returning entries of data in a non-blocking fashion concurrently with other entries of data being processed.

10. A method of grouping entries of data, comprising: prior to a potential overflow within a primary memory, grouping each input row of data and returning the data in a non-blocking fashion; and in case of the overflow, ensuring that a user eventually receives the correct remaining rows, wherein in the non-blocking fashion individual rows of data that match a query are output to the user prior to a processing node processing all data from the query.

11. A method of grouping entries of data, comprising: segmenting the groups into clusters that limit a potential overflow to one cluster at a time; prior to the potential overflow, all clusters perform work in a non-blocking fashion; and in case of the overflow, transferring clusters one at a time from a primary memory to a secondary memory, while remaining non-transferred clusters still function in a non-blocking fashion, wherein in the non-blocking fashion data matching a query is output concurrently while data potentially matching the query is being processed.

12. A method of grouping entries of data, comprising: prior to a potential overflow within a primary memory, grouping each input row of data and returning the data in a non-blocking fashion; and in case of the overflow in which at least some of the data is transferred from the primary memory to a secondary memory, this data on the secondary memory is later processed in a non-blocking fashion concurrently with processing the remaining data, wherein in the non-blocking fashion data matching a query is output concurrently while data being received for the query is still being processed.

* * * * *